United States Patent [19]

Worschech et al.

[11] 3,875,069

[45] Apr. 1, 1975

[54] LUBRICANT COMPOSITIONS USEFUL IN THE SHAPING OF THERMOPLASTIC MATERIALS

[75] Inventors: Kurt Worschech, Bexhovede; Kurt Wolf; Helmut Kachel, both of Bremerhaven, all of Germany

[73] Assignee: Neynaber Chemie GmbH, Bremerhaven, Germany

[22] Filed: Apr. 13, 1973

[21] Appl. No.: 350,917

[30] Foreign Application Priority Data

Dec. 20, 1972 Germany ........................... 2262266

[52] U.S. Cl. .......... 252/56 S, 260/31.6, 260/31.8 R, 260/31.8 W

[51] Int. Cl. ........................................ C10m 1/24

[58] Field of Search .... 252/56 S; 260/31.6, 31.8 W, 260/31.8 C

[56] References Cited

UNITED STATES PATENTS

| | | | |
|---|---|---|---|
| 2,871,248 | 1/1959 | Kirkland et al. | 252/56 S X |
| 2,991,297 | 7/1961 | Cooley et al. | 252/56 S X |
| 3,000,917 | 9/1961 | Babayan | 252/56 S X |
| 3,053,768 | 9/1962 | Cupper | 252/56 S X |
| 3,194,764 | 7/1965 | Ovist et al. | 252/56 S |
| 3,516,957 | 6/1970 | Gray et al. | 260/31.6 X |
| 3,784,501 | 1/1974 | Pettit | 260/31.6 X |

OTHER PUBLICATIONS

Murphy et al., "Ind. Eng. Chem.," Vol. 42 (1950), pages 2415 to 2420.

*Primary Examiner*—W. Cannon
*Attorney, Agent, or Firm*—Hammond & Littell

[57] ABSTRACT

Lubricant compositions useful in the shaping of thermoplastic materials comprising a mixture of (A) mixed esters of aliphatic polyols, dicarboxylic acids and long-chained aliphatic monocarboxylic acids, and (B) esters of the groups: (1) esters of dicarboxylic acids and long-chained aliphatic monofunctional alcohols, (2) esters of long-chained aliphatic monofunctional aochols and long-chained aliphatic monocarboxylic acids, (3) complete or partial esters of aliphatic polyols and long-chained aliphatic monocarboxylic acids, in a ratio of (A) to (B) of from 1:3 to 9:1.

11 Claims, No Drawings

LUBRICANT COMPOSITIONS USEFUL IN THE SHAPING OF THERMOPLASTIC MATERIALS

THE PRIOR ART

The shaping of thermoplastic material is done according to known methods, such as calendering, pressing, continuous casting, or extruding at elevated temperature. The known processing techniques result in many technical problems for which many solutions have been suggested, such as by adding various aids to the plastics.

A great number of lubricants suggested so far for the shaping of thermoplastic materials primarily impart to the latter an improved fluidity. Examples of these known lubricants include paraffins of various molecular weights and degree of branching, fatty alcohols, naturally occurring and synthetic, higher molecular aliphatic monocarboxylic acids, as well as amides derived from them, metal soaps and simple esters. Examples of naturally occuring esters include carnauba wax and beeswax, while examples of synthetically produced esters include ethyl palmitate, butyl stearate, octyl stearate, ethylene glycol monostearate, ethylene glycol distearate and glycerin monooleate. Esters of polycarboxylic acids with long-chained aliphatic monovalent alcohols, for example dioctyl-sebacate have also been suggested as lubricants for shaping thermoplastic masses based on the polyamides.

The prior art lubricants known up to now, and particularly the products derived from long-chained aliphatic carboxylic acids, impart an improved fluidity to the thermoplastic to be processed, but they do not prevent to a sufficient extent the sticking of the thermoplastics to the hot metal parts of the processing machines. Lubricants which impart an improved fluidity to the thermoplastic masses being processed are referred to as "internal lubricants". Lubricants designed to prevent sticking of the thermoplastic masses being processed to the hot metal parts of the processing machines are referred to as "external lubricants". An advantage of the above-mentioned internal lubricants is that they are highly compatible with thermoplastic materials, such as polyvinyl chloride, polystyrene, vinyl chloride-copolymers and styrene-copolymers; and they do not impair the transparency of the thermoplastics, nor do they impair the further processing of semifinished products such as by welding, pressing, and cementing. However, large additions of these lubricants to the thermoplastics, which may not be great enough to impair the transparency and cause opacity, can result in considerable reductions of the dimensional stability under heat or result in considerable reductions of other mechanical properties.

Lubricants are also known which are particularly useful with chlorinated polymers, like polyvinyl chloride, and which impart satisfactory non-stickiness during the shaping. Thus, combinations of paraffins with silicone oils have been suggested as such external lubricants.

Such types of compounds impart a sufficient non-stickiness during the process shaping, but form a closed coating film on the surface of the shaped semi-finished or finished product which makes subsequent treatment, such as welding, cementing, printing, varnishing, etc. very difficult, if not impossible. This sweating effect appears already after very small additions of lubricants, for example, 0.1%. Further examples of this type of external lubricants include esters of extremely long-chained fatty acids, such as montanic acid or mixed esters from dicarboxylic acids, aliphatic polyols and aliphatic long-chained monocarboxylic acid. The non-stickiness of these last mentioned lubricants depends on the concentration; and it requires that substantial additions be made to the polymer to be processed, in order to achieve optimum non-stickiness without causing harmful incompatibilities. Even with small additions of lubricants, in specific cases under 0.1 parts by weight per 100 parts by weight of the chlorinated polymer, opacities and other incompatibility-phenomena appear. It is therefore frequently impossible to avoid incompatibilities at the minimum concentration of the lubricant determined by the processing method and the processing temperature, or frequently impossible to obtain a clear glasslike, weldable and printable end product by reducing the lubricant concentration. The problem was therefore to achieve the positive benefits of the last mentioned mixed esters in preventing the sticking of the plastic compunds onto the hot parts of the processing machines, even in such low concentrations that no opacities or other incompatibility-phenomonen would appear.

OBJECTS OF THE INVENTION

An object of the invention is the development of an effective lubricant composition which can overcome the drawbacks of the above cited art.

A further object of the invention is the development of a lubricant composition useful in the shaping of thermoplastic material comprising (A) mixed esters with hydroxyl and acid numbers of 0 to 6 of (a) alkane polyols having 2 to 6 hydroxyl groups and 2 to 10 carbon atoms, (b) a dicarboxylic acid selected from the group consisting of aliphatic hydrocarbon dicarboxylic acids having 2 to 22 carbon atoms, cycloalkane dicarboxylic acids of 5 to 10 carbon atoms, aromatic hydrocarbon dicarboxylic acids of 8 to 14 carbon atoms, and the mixtures thereof, and (c) aliphatic hydrocarbon monocarboxylic acids having 12 to 30 carbon atoms, said mixed esters having a molecular weight of at least 524, and (B) esters selected from the group consisting of (1) esters of the dicarboxylic acids of (A)(b) and aliphatic monofunctional alcohols of 12 to 30 carbon atoms, (2) esters of aliphatic monofunctional alcohols having 12 to 30 carbon atoms and aliphatic hydrocarbon monocarboxylic acids with 12 to 30 carbon atoms, and (3) complete esters or partial esters of alkanepolyols having 2 to 6 hydroxyl groups and 2 to 10 carbon atoms and aliphatic hydrocarbon monocarboxylic acids having 12 to 30 carbon atoms, with the ratio by weight of (A) to (B) being 1:3 to 9:1.

A yet further object of the invention is the development of a process for shaping thermoplastic material by incorporating from 0.1 to 5% by weight of the above lubricant composition to the thermoplastic material prior to effecting its shaping.

These and other objects of the present invention will become more apparent as the description thereof proceeds.

DESCRIPTION OF THE INVENTION

The above objects have been achieved and the drawbacks of the prior art have been overcome by the development of lubricant compositions with a content of A. mixed esters with hydroxyl and/or acid numbers of 0 to 6 of
   a. aliphatic, cycloaliphatic and/or aromatic dicarboxylic acids,
   b. aliphatic polyols,
   c. aliphatic monocarboxylic acids with 12 to 30 carbon atoms in the molecule, and
B. Esters of the group
   1. esters from dicarboxylic acids and long-chained aliphatic monofunctional alcohols with 12 to 30 carbon atoms in the molecule,
   2. esters from long-chained aliphatic monofunctional alcohols with 12 to 30 carbon atoms in the molecule and long-chained monocarboxylic acids with 12 to 30 carbon atoms in the molecule,
   3. full esters or partial esters from aliphatic polyols and long-chained aliphatic monocarboxylic acids with 12 to 30 carbon atoms in the molecule, which are used for shaping of thermoplastic compounds, where the ratio by weight of mixed esters (A) to esters (B) is 1:3 to 9:1.

More particularly, the invention involves a lubricant composition useful in the shaping of thermoplastic material comprising (A) mixed esters with hydroxyl and acid numbers of 0 to 6 of (a) alkane polyols having 2 to 6 hydroxyl groups and 2 to 10 carbon atoms, (b) a dicarboxylic acid selected from the group consisting of aliphatic hydrocarbon dicarboxylic acids having 2 to 22 carbon atoms, cycloalkane dicarboxylic acids of 5 to 10 carbon atoms, aromatic hydrocarbon dicarboxylic acids of 8 to 14 carbon atoms, and the mixtures thereof, and (c) aliphatic hydrocarbon monocarboxylic acids having 12 to 30 carbon atoms, said mixed esters having a molecular weight of at least 524, and (B) esters selected from the group consisting of (1) esters of the dicarboxylic acids of (A)(b) and aliphatic monofunctional alcohols of 12 to 30 carbon atoms, (2) esters of aliphatic monofunctional alcohols having 12 to 30 carbon atoms and aliphatic hydrocarbon monocarboxylic acids with 12 to 30 carbon atoms, and (3) complete esters or partial esters of alkanepolyols having 2 to 6 hydroxyl groups and 2 to 10 carbon atoms and aliphatic hydrocarbon monocarboxylic acids having 12 to 30 carbon atoms, with the molar ratio of (A) to (B) being 1:3 to 9:1; as well as the process of shaping the monoplastic materials by adding from 0.1 to 5% by weight of the lubricant composition to the thermoplastic material prior to shaping the same.

It has been unexpectedly determined that it is possible with the above combination of A and B to achieve, with a substantially smaller amount of a mixed ester A, a greater degree of non-stickiness at normal processing temperatures than if this mixed ester A were used alone, even though the other esters B by themselves have no influence or only a very minor influence on the non-stickiness of the processing thermoplastic materials.

Particularly suitable lubricant combinations are those where the component (A) consists of mixed esters with hydroxyl and/or acid numbers of 0 to 6 of
a. aliphatic, cycloaliphatic and/or aromatic dicarboxylic acids with 2 to 22 carbon atoms in the molecule,
b. aliphatic polyols with 2 to 6 hydroxyl groups in the molecule, and
c. aliphatic monocarboxylic acids with 12 to 30 carbon atoms in the molecule.

The molar ratio of dicarboxylic acids to polyol to monocarboxylic acid in the mixed esters (A) used can assume different values, and it has been found preferable for obtaining products with the desired properties to maintain a ratio of dicarboxylic acid to polyol to monocarboxylic acid of $(n-1) : n : nm - 2(n-1)$. In this ratio, $n$ denotes an integer of from 2 to 11, and $m$ which represents the functionality of the polyol used is thereby an integer of from 2 to 6. A slight deviation from the ratios is possible as long as mixed esters obtained are those whose hydroxyl and/or acid numbers do not exceed the value 6. The value of $n$ determines also to a great extent the character of the mixed esters, since lower molecular products are obtained with lower values of $n$ and since higher molecular products are obtained with higher values of $n$.

Particularly suitable as mixed esters of (A) are those based on adipic acid, pentaerythrite and stearic acid or oleic acid, in which the ratio of adipic acid to pentaerythrite to stearic/oleic acid is $(n-1) : n : 4n - 2(n-1)$, where $n$ represents in the case of stearic acid an integer of 2 to 8 and in the case of oleic acid an integer of 2 to 7. Preferred products have in the case of stearic acid, for example, a ratio of the mixed ester components adipic acid : pentaerythrite : stearic acid of 1:2:6 or 2:3:8 or 4:5:12 or 6:7:16 or 7:8:18; and in the case of oleic acid the preferred products have, for example, a ratio of adipic acid : pentaerythrite : oleic acid of 1:2:6 or 3:4:10 or 5:6:14.

The production of the mixed esters to be utilized according to the invention is effected according to known esterification methods; for example, the long-chained aliphatic monocarboxylic acids are esterified with bifunctional or polyfunctional polyols that the partial ester obtained still contains one or several free hydroxyl groups. Then, these hydroxyl groups are reacted with the corresponding dicarboxylic acids. Another process embodiment includes first esterifying a part of the hydroxyl groups of a polyol with a dicarboxylic acid and then reacting the remaining free hydroxyl groups of the partial ester obtained with longer-chained aliphatic monocarboxylic acids. The starting materials can be used in different quantitative ratios for the production of the mixed esters, provided that the total numbers of the carboxyl groups and of the hydroxyl groups in the starting materials are the same. The mixed esters obtained according to this invention then contain practically no free carboxyl and/or hydroxyl groups and have hydroxyl and/or acid numbers of 0 to 6.

In the simplest case, 1 mol of a dicarboxylic acid, 2 mols of an $n$-functional polyol and $2n-2$ mols of a monocarboxylic acid are esterified, for example, in known manner, preferably in two esterifications stages. Two process embodiments are possible. In the first process embodiment, 1 mol of a dicarboxylic acid is esterified in the first stage with 2 mols of the polyol to such an extent that the acid number is practically zero. Subsequently, the product is esterified in the second stage with the stoichiometrically required amount of monocarboxylic acid to such an extent that practically no free hydroxyl groups and carboxyl groups are present any longer; that is, both the OH-number and the acid number ranged between 0 to 6.

In the second process embodiment, 2 mols of $n$-functional polyol are esterified with $2n-2$ mols of a long-chained monocarboxylic acid in the first stage until the acid number is practically zero. Then the esterification is completed in a second stage with 1 mol of a dicarboxylic acid until the mixed ester obtained contains no free hydroxyl groups and carboxyl groups; that is, both its OH number and acid number ranges between 0 to 6. Furthermore, it is also possible to effect the formation of the mixed ester from the starting components in a single-stage process.

Among the mixed esters that can be used as lubricant components according to the invention are high molecular products as well as the low molecular products produced as described above. These high molecular products can be produced by selecting as a molar ratio of the polyol to the dicarboxylic acid a ratio of less than 2:1, but not less than 1:1, for example, 5:4 or 7:6. The excess of hydroxyl groups remaining after the polyester formation of these components is esterified by an equivalent amount of saturated or unsaturated long-chained monocarboxylic acids or of a mixture of long-chained monocarboxylic acids, so that mixed esters are again formed which have practically no free hydroxyl and carboxyl groups. In this case, the esterification reaction of the starting components can also be carried out either in a two-stage or in a single-stage process. These high-molecular mixed polyesters have an extremely low vapor pressure at the processing temperatures customary for the shaping of thermoplastic compounds. For this reason, these mixed esters are particularly valuable as components for the lubricant according to the invention used for shaping thermoplastic compounds.

Suitable starting materials for the production of the lubricant component A according to the invention (both the lower molecular weight mixed esters and the higher molecular weight mixed esters) are listed below.

Suitable examples of dicarboxylic acids of 2 to 22 carbon atoms include saturated and unsaturated aliphatic hydrocarbon dicarboxylic acids of 2 to 22 carbon atoms; for example, alkanedioic acids of 2 to 22 carbon atoms such as oxalic acid, malonic acid, succinic acid, glutaric acid, adipic acid, pimelic acid, suberic acid, azelaic acid, sebacic acid, nonanedioic acid, undecanedioic acid and eicosanedioic acid; and alkenedioic acids of 4 to 22 carbon atoms such as maleic acid, fumaric acid, citraconic acid, mesaconic acid and itaconic acid. Other suitable examples of dicarboxylic acids include cycloaliphatic-dicarboxylic acids of 5 to 10 carbon atoms, for example, cycloalkanedioic acids of 5 to 10 carbon atoms, such as cyclopropane-dicarboxylic acid, cyclobutane-dicarboxylic acid, cyclopentane-dicarboxylic acid, camphoric acid and hexahydrophthalic acid, as well as aromatic hydrocarbon dicarboxylic acids of 8 to 14 carbon atoms, for example, mononuclear aromatic dicarboxylic acids such as phthalic acid, terephthalic acid and isophthalic acid, and for example, dinuclear aromatic dicarboxylic acids such as naphthalic acid and diphenyl-o,o'-dicarboxylic acid.

Suitable examples of polyol components for the production of the mixed exters include alkanepolyols having 2 to 6 hydroxyl groups and 2 to 10 carbon atoms such as alkanediols of 2 to 10 carbon atoms such as ethylene glycol, 1,2- and 1,3-propylene glycol, 1,4-butanediol, 2,3-butanediol, 1,5-pentanediol and 1,6-hexanediol, as well as alkanetriols of 3 to 10 carbon atoms such as glycerin and trimethylol propane, alkanetetrols of 4 to 10 carbon atoms such as erythrite and pentaerythrite, alkanepentols of 5 to 10 carbon atoms such as xylitol, alkanehexols of 6 to 10 carbon atoms such as mannitol, sorbitol and dipentaerythrite.

Suitable examples of long-chained aliphatic monocarboxylic acids of 12 to 30 carbon atoms useful for the production of mixed esters according to the invention include alkanoic acids of 12 to 30 carbon atoms, such as lauric acid, tridecylic acid, myristic acid, palmitic acid, margaric acid, stearic acid, arachic acid, eicosanecarboxylic acid, behenic acid, lignoceric acid, cerotic acid; hydroxyalkanoic acids of 12 to 30 carbon atoms such as 12-hydroxy stearic acid, alkenoic acids of 12 to 30 carbon atoms such as oleic acid, elaidic acid, erucic acid and montanic acid, hydroxyalkenoic acids of 12 to 30 carbon atoms such as ricinoleic acid; alkadienoic acids of 12 to 30 carbon atoms such as linoleic acid; alkatrienic acids of 12 to 30 carbon atoms such as linolenic acid; as well as mixtures of fatty acid fractions of 12 to 20 carbon atoms which are obtainable from natural fats and oils, for example fatty acid mixtures from olive oil, rape seed oil, coconut oil, palm oil, soybean oil, cottonseed oil and linseed oil.

The products to be used in the lubricants according to the invention as a mixed ester component (A) vary in their state of matter from oily liquids to hard waxes. These differences in their consistency at room temperature result, however, in no differences in their action.

The physical consistency of the product at room temperature is established not by the amount of the molecular weight, as is the case of monocarboxylic acid esters of a simple structure. In addition, the particular dicarboxylic acid or polyol likewise has no essential effect on the physical consistency at room temperature of the mixed ester according to the invention. However, of great importance in determining the melting point is whether the long-chained monocarboxylic acids used are primarily of a saturated or of an unsaturated nature. Mixed esters which exclusively contain as a monocarboxylic acid component, saturated aliphatic monocarboxylic acids with 12 to 30 carbon atoms, are solid, hard waxes with melting points of above 50°C. On the other hand, if one were to use for the production of the mixed esters as a monocarboxylic acid component, unsaturated aliphatic monocarboxylic acids with 12 to 30 carbon atoms, or monocarboxylic acid mixtures with substantially unsaturated portions, the resulting ester products would be oily liquids at room temperature and would have solidifying points below 0°C. Thus, for example, a mixed ester of adipic acid, pentaerythrite and oleic acid has a solidifying point of −33°C, while a mixed ester of a similar structure whose monocarboxylic acid component is not oleic acid but is a partly unsaturated fatty acid mixture of the chain lengths $C_{16}$ to $C_{18}$ with an iodine number of 50, has a solidifying point of −15°C.

In practical use, the mixed esters of adipic acid, pentaerythrite and long-chained monocarboxylic acids with 12 to 30 carbon atoms, particularly stearic acid and oleic acid, have proved to be most preferable as the lubricant component A. Of particular importance are the higher molecular mixed esters based upon the above-mentioned three starting materials. The molecular weight of these mixed esters is at least 524, but preferably above 2000.

The second component (B) of the lubricant combination to be used according to the invention consists in the first case of esters of dicarboxylic acids and long-chained aliphatic monofunctional alcohols with 12 to 30 carbon atoms in the molecule.

Suitable examples of dicarboxylic acids of 2 to 22 carbon atoms include saturated and unsaturated aliphatic hydrocarbon dicarboxylic acids of 2 to 22 carbon atoms, for example, alkanedioic acids of 2 to 22 carbon atoms, such as oxalic acid, malonic acid, succinic acid, glutaric acid, adipic acid, pimelic acid, suberic acid, azeleic acid, sebacic acid, nonanedioic acid, undecanedioic acid and eicosanedioic acid, and alkenedioic acids of 4 to 22 carbon atoms such as maleic acid, fumaric acid, citraconic acid, mesaconic acid and itaconic acid. Other suitable examples of dicarboxylic acids include cycloaliphatic dicarboxylic acids of 5 to 10 carbon atoms, for example, cycloalkanedioic acids of 5 to 10 carbon atoms, such as cyclopropane-dicarboxylic acid, cyclobutane-dicarboxylic acid, cyclopentane-dicarboxylic acid, camphoric acid and hexahydrophthalic acid, as well as including aromatic hydrocarbon dicarboxylic acids of 8 to 12 carbon atoms, for example, mononuclear aromatic dicarboxylic acids such as phthalic acid, terephthalic acid and isophthalic acid, and for example dinuclear aromatic dicarboxylic acids such as naphthalic acid and diphenyl-o,o'-dicarboxylic acid. Of special importance is phthalic acid.

Suitable examples of long-chained aliphatic monofunctional alcohols of 12 to 30 carbon atoms used for the production of the above mentioned esters (B) include alkanols of 12 to 30 carbon atoms such as dodecyl alcohol, tridecyl alcohol, isotridecyl alcohol, tetradecyl alcohol, hexadecyl alcohol, isohexadecyl alcohol, stearyl alcohol and behenyl alcohol; alkenols of 12 to 30 carbon atoms such as oleyl alcohol; as well as alcohol mixtures that are obtained by hydrogenating fatty acid mixtures of 12 to 30 carbon atoms as obtained from natural fats and oils, such as olive oil, rapeseed oil, coconut oil, palm oil, soybean oil, cottonseed oil and linseed oil.

Examples of esters of dicarboxylic acids and long-chained alcohols, which are suitable as the second component (B) of the lubricants according to the invention, are di-hexadecyl adipate, di-stearyl adipate, di-oleyl sebacate. Examples of preferred esters include di-tridecyl phthalate, di-hexadecyl phthalate, stearyl-cetyl phthalate, di-stearyl phthalate, di-oleyl phthalate, and di-behenyl phthalate plus phthalic acid diesters of coconut fatty alcohols, olive oil fatty alcohols and tallow fatty alcohols. Preferred among the esters of dicarboxylic acids and long-chained alcohols is distearyl phthalate.

The second component (B) of the lubricant combination to be used according to the invention consists in the second case of esters of long-chained aliphatic alcohols and long-chained monocarboxylic acids. The long-chained aliphatic alcohols suitable for the production of the esters are identical to those mentioned above in regard to the esters of dicarboxylic acids and long-chained alcohols.

Suitable examples of long-chained aliphatic monocarboxylic acids of 12 to 30 carbon atoms useful for the production of mixed esters according to the invention include alkanoic acids of 12 to 30 carbon atoms, such as lauric acid, tridecyl acid, myristic acid, palmitic acid, margaric acid, stearic acid, arachic acid, eicosanecarboxylic acid, behenic acid, lignoceric acid, cerotic acid, hydroxyalkanoic acids of 12 to 30 carbon atoms such as 12-hydroxystearic acid; alkenoic acids of 12 to 30 carbon atoms such as oleic acid, elaidic acid, erucic acid, and montanic acid, hydroxyalkenoic acids of 12 to 30 carbon atoms such as ricinoleic acid; alkadienoic acids of 12 to 30 carbon atoms, such as linoleic acid; alkatrienoic acids of 12 to 30 carbon atoms such as linolenic acid; as well as mixtures of fatty acid fractions of 12 to 30 carbon atoms which are obtainable from natural fats and oils, for example, fatty acid mixtures from olive oil, rape seed oil, coconut oil, palm oil, soybean oil, cottonseed oil and linseed oil.

Examples of esters from long-chained alcohols and long-chained monocarboxylic acids, which are suitable as a second component of the lubricants according to the invention include stearyl laurate, cetyl myristate, stearyl palmitate, cetyl stearate, isotridecyl stearate, isohexadecyl stearate, isooctadecyl stearate, hexadecyl behenate, stearyl oleate, oleyl palmitate, coconut fatty acid esters of tallow fatty alcohol. A preferred second component of (B) is isotridecyl stearate whose alcohol substituent was obtained according to the oxo-method.

The second ingredient (B) of the lubricant-combination to be used according to the invention consists in the third case of complete esters or partial esters of aliphatic polyols and long-chained monocarboxylic acids. The long-chained monocarboxylic acids suitable for the production of these esters are the same as mentioned above, in regard to the esters of long-chained alcohols and long-chained monocarboxylic acids.

Suitable aliphatic polyols are the alkanepolyols having 2 to 6 hydroxyl groups and 2 to 10 carbon atoms listed above for the polyol component of the mixed ester (A).

Examples of esters of polyols and long-chained monocarboxylic acids, which are suitable as a second component of the lubricants according to the invention are ethylene glycol dioleate, glycerin trilaurate, glycerin monooleate, glycerin dioleate, glycerin trioleate, glycerin tristearate, glycerin tri-12-hydroxystearate, castor oil, hardened castor oil, cottonseed oil, 1,3-propylene glycol distearate, 1,6-hexanediol dimyristate, trimethylolpropane dibehenate, pentaerythrite trilaurate, tristearic acid esters of sorbitol. An ester mixture that can be used with particularly good results as a second lubricant component (B) according to the invention, consists of about 60% glycerin triester of 12-hydroxystearic acid, about 20% glycerin diester of 12-hydroxystearic acid and about 20% glycerin monoester of 12-hydroxystearic acid. This ester mixture can be obtained either by esterification of glycerin with 12-hydroxystearic acid in a suitable molar ratio, or by partial transesterification of hardened castor oil with glycerin. Another preferred example is glycerin monooleate which also produces very good results in the lubricant composition.

The esters to be used as a second component for the lubricant combination according to the invention can be solid or liquid at room temperature. Their molecular weight should not exceed 1500.

It has been found preferable in putting together the lubricant combinations according to the invention to utilize the first and second components which are both solid at room temperature, or which are both liquid at room temperature. The products used as a first component and as a second component should have the property of being miscible in any desired ratio when combined in the melt, so that homogeneous mixtures of the components are produced.

As mentioned above, the mixed esters to be used according to the invention as a first component (A) in the lubricant-combinations are particularly effective if their molecular weight are greater than 2000. These products, due to their high molecular weight, are obtained in the form of a highly viscous melt whose purification by bleaching, filtering, etc. is very difficult. It was found that the purification of the higher molecular weight mixed esters is substantially facilitated if an ester serving as a second component (B) is added immediately after the production of the mixed ester and before it is purified. The combination is then purified in known manner, and the result is a substantially lighter-colored product than would be obtained if the mixed ester were subjected to purification by itself. Furthermore, it is possible, by adding a liquid ester serving as a second component, to considerably reduce the viscosity of the lubricant-combination according to the invention, if this is desired for processing reasons, for example, if the lubricant-combination is to be readible pumpable.

All the lubricant combinations according to the invention can be subjected to those shaping processes suitable for thermoplastic compounds, whether they are polymers, polycondensates or polyaddition products. The lubricants according to the invention are particularly suitable for the shaping of chlorinated polymers, such as polyvinyl chloride, polyvinylidene chloride, as well as copolymers derived therefrom. Moreover, the lubricants according to the invention can also be utilized advantageously in the shaping of other plastics, such as polystyrene, polyacrylic acid esters, polymethacrylic acid esters, polyamides and polyurethanes.

The lubricant-combinations according to the invention are employed in practice by adding them to the thermoplastic materials to be processed, before the processing thereof. The amount added depends on the thermoplastic material to be processed and depends on the type of processing used, and ranges between 0.01 and 5% by weight, preferably 0.05 to 0.5% by weight. After homogeneous distribution of the lubricant in the plastic, the shaping can be effected in known manner.

The following examples are merely illustrative of the present invention without being deemed limitative in any manner thereof.

EXAMPLES

The mixed esters (A) of dicarboxylic acids, polyols and long-chained monocarboxylic acids used in the following examples as well as their combinations with the ester components (B) of dicarboxylic acids and long-chained alcohols or long-chained alcohols and long-chained monocarboxylic acids in the lubricants according to the invention were produced as follows:

EXAMPLE 1

Mixed Ester of Adipic Acid, Pentaerythrite and Stearic Acid

A three-necked round bottom flask with stirrer, thermometer and descending Liebig condenser, was charged with 95 gm of pentaerythrite (0.7 mols), 432 gm of technical stearic acid (1.6 mols), and 1.2 gm of tin dust. The mixture was heated to 200°C to 210°C and a light vacuum was then applied. This vacuum was increased during the course of four hours to about 20 torr. After that time the acid number had dropped to below 0.5. The mixture was cooled while stirring to about 150°C. The condenser was replaced by a water-separator. After adding 100 gm of xylene, 88 gm of adipic acid (0.6 mol) and again 0.6 gm of tin dust, the esterification was completed under azeotropic conditions. Within four hours the calculated amount of reaction water had formed. The acid number was 5. The xylene was distilled off under vacuum. The melt obtained was highly viscous and could be treated further by bleaching and filtering only under great difficulties. After cooling, a yellowish hard wax with a dropping point of 60°C was obtained.

EXAMPLE 2

Lubricant Combination of a Mixed Ester of Adipic Acid, Pentaerythrite and Stearic Acid (First Component A) and Distearyl Phthalate (Second Component B)

Utilizing a procedure analogous to that described in Example 1, a mixed ester of adipic acid, pentaerythrite and stearic acid was produced. The procedure up to the distillation of the xylene under vacuum was identical to that described in Example 1. Then, distearyl phthalate was introduced into the melt in a weight ratio of 30 parts distearyl phthalate to 70 parts mixed ester; and a homogeneous low-viscous melt was obtained which could be easily treated in known manner with bleaches and filtered. After cooling, a practically colorless hard wax with a dropping point of 50°C was obtained.

EXAMPLE 3

Mixes Ester of Adipic Acid, Pentaerythrite and Oleic Acid:

Utilizing an esterification procedure analogous to that described in Example 1, 110 gm of pentaerythrite (0.83 mol), 546 gm of oleic acid (2 mols) and 95 gm of adipic acid (0.67 mols) were reacted in a two-stage method. The oil obtained after distillation of xylene under vacuum had an acid number of 6 and had a viscosity at 20°C of 1000 cP. Treatment with bleaches and then filtration were only possible under great difficulties.

EXAMPLE 4

Lubricant-Combination from a Mixed Ester of Adipic Acid, Pentaerythrite, and Oleic Acid (First Component A) and Isotridecyl Stearate (Second Component B)

For the production of the mixed ester from adipic acid, pentaerythrite and oleic acid (first component) a procedure identical to that described in Example 3 up to the distillation of xylene under vacuum was utilized. The highly viscous oil obtained was mixed in a weight ratio of 1:1 with isotridecyl stearate, whose viscosity at 20°C was 30 cP. The mixture obtained had a viscosity at 20°C of 130 cP and could easily be treated in known manner with bleaches and then filtered.

EXAMPLE 5

Second Lubricant-Component Comprising Glycerin Esters of Hardened Castor Oil Fatty Acids Under known conditions 1 mol of hardened castor oil was trans-esterified with 2 mols of glycerin. The reaction mixture which was obtained contained the glycerin-monoester of the hardened castor oil fatty acid and glycerin diester of the hardened castor oil fatty acid in a weight ratio of 1:1, in addition to unreacted hardened castor oil and glycerin. After separation of the glycerin, the purified reaction mixture was mixed with hardened castor oil in a weight ratio of 1:1, treated by bleaching and then cooled. The lubricant-component obtained consisted of 60% triglyceride, 20% diglyceride, and 20% monoglyceride of the hardened castor oil fatty acid which consisted primarily of 12-hydroxy stearic acid. This lubricant component could be used, as described above in Example 2, instead of the distearyl phthalate used therein, and yielded a solid lubricant mixture of practically colorless quality.

EXAMPLE 6

Plastic masses containing each 300 gm of a suspension polymerized polyvinyl chloride of the K-value 60 (Vinnol H 60 D R) and 4.5 gm of a thio-tin stabilizer (Advstab 18 M R), and which differed by the addition of different lubricants, were processed on a rolling mill. The rolls of the rolling mill had a cylinder width of 400 mm and a cylinder diameter of 220 mm. The speed of the two rolls was 12.5 rpm, and the surface temperature was 185°C. The gap width between the two rolls was so adjusted that the thickness of the revolving sheet was uniformly 0.6 mm. With the sheet constantly revolving, the stickiness of the compound on the roll surfaces was observed, and the time from charging the rolling mill to the time of pronounced stickiness was measured. This time is an indication of non-stickiness of the lubricant utilized. Apart from a lubricant-free reference mixture, the total addition of lubricant to the above indicated basic composition was kept at the same level, namely at 0.6 gm. The non-stick values were determined based upon the addition of lubricants and the results are set forth in Table I.

TABLE I

| Total addition of lubricants in parts by weight per 100 parts by weight PVC | Addition of mixed esters produced according to Example 1 in parts by weight per 100 parts by weight PVC | Addition of ester mixture produced according to Example 5 in parts by weight per 100 parts by weights PVC | Non-stickiness on the rolling mill at 185°C in minutes |
|---|---|---|---|
| 0 | 0 | 0 | 5 |
| 0.2 | 0 | 0.2 | 5 |
| 0.2 | 0.05 | 0.15 | 35 |
| 0.2 | 0.1 | 0.1 | 65 |
| 0.2 | 0.15 | 0.05 | 85 |
| 0.2 | 0.2 | 0 | 75 |

It was surprisingly found here that the first component mixed ester product of Example 1 which is known for its good non-stick-effect is surpassed and exceeded in non-stick effectiveness by a combination of 0.15 parts by weight of the mixed ester produced according to Example 1 and 0.05 parts by weight of the ester mixture produced according to Example 2. The Example 2 product is ineffective by itself as far as non-stickiness is concerned.

EXAMPLE 7

Utilizing a procedure analogous to that described in Example 6, mixtures of the polyvinyl chloride of Example 6, of the stabilizer of Example 6, and of the lubricants were tested for their non-stickiness on the rolling mill at 185°C. Lubricant-combinations according to the invention from a mixed ester produced according to Example 1 (first component) and glycerin-mono-oleate (the second component of Example 2) were compared with the lubricant components used individually and with a lubricant-free standard batch. The results are reported below in Table II.

TABLE II

| Total addition of lubricants in parts by weight per 100 parts by weight PVC | Addition of mixed ester produced according to Example 1 in parts by weight per 100 parts by weight PVC | Addition of glycerin-monooleate in parts by weight per 100 parts by weight PVC | Non-stickiness on the rolling mill at 185°C in minutes |
|---|---|---|---|
| 0 | 0 | 0 | 5 |
| 0.2 | 0 | 0.2 | 5 |
| 0.2 | 0.05 | 0.15 | 15 |
| 0.2 | 0.1 | 0.1 | 90 |
| 0.2 | 0.15 | 0.05 | 75 |
| 0.2 | 0.2 | 0 | 75 |

From Table II it is to be observed that there is a greater advantage in using the lubricant-combinations according to the invention, than was observed in Example 6. A combination of 0.1 parts by weight each of the mixed ester consisting of the product of Example 1 (first component A) and of glycerin-mono-oleate (second component B), exceeds in its non-stick effect both an equally high addition of the mixed ester product of Example 1 and an equally high addition of the glycerin-mono-oleate which is ineffective as far as non-stickiness is concerned.

EXAMPLE 8

Utilizing a procedure analogous to that described in Example 6, a mixture consisting of the polyvinyl chloride described in Example 6, of the stabilizer described in Example 6, and of the various lubricants were tested for their non-stickiness on the rolling mill at 185°C. Combinations of a mixed ester produced according to Example 1 (first component A) and distearyl phthalate (second component B) were compared with the components used individually by themselves and with a lubricant-free standard control. The results are reported below in Table III.

TABLE III

| Total addition of lubricants in parts by weight per 100 parts by weight PVC | Addition of lubricants produced according to Example 1 in parts by weight per 100 parts by weight PVC | Addition of distearylphthalate in parts by weight per 100 parts by weight PVC | Non-stickiness on rolling mill at 185°C in minutes |
|---|---|---|---|
| 0 | 0 | 0 | 5 |
| 0.2 | 0 | 0.2 | 5 |
| 0.2 | 0.05 | 0.15 | 15 |
| 0.2 | 0.1 | 0.1 | 75 |
| 0.2 | 0.14+ | 0.06+ | 85 |
| 0.2 | 0.2 | 0 | 75 |

+Combination of this ratio is identical with the product of Example 2.

From Table III it is clearly indicated that the composition having the maximum effectiveness as a non-stick agent has a weight ratio of 0.14 parts of the first component A to 0.06 parts of the second component B. A combination of these components in the applied mixture can be produced according to the method described in Example 2.

The preceding specific embodiments are illustrative of the practice of the invention. It is to be understood, however, that other expedients known to those skilled in the art, or disclosed herein, may be employed without departing from the spirit of the invention or the scope of the appended claims.

We claim:

1. A lubricant composition useful in the shaping of thermoplastic material consisting essentially of (A) mixed esters with hydroxyl and acid numbers of 0 to 6 of adipic acid, pentaerythrite and an aliphatic hydrocarbon monocarboxylic acid with 12 to 30 carbon atoms in an average molar ratio of about $(n-1):n:4n-2(n-1)$, wherein $n$ is an integer from 2 to 11, said mixed esters having a molecular weight of at least 524, and (B) esters selected from the group consisting of (1) esters of phthalic acid and alkanols of 12 to 30 carbon atoms, and (2) partial esters of glycerin and aliphatic hydrocarbon monocarboxylic acids having 12 to 30 carbon atoms and mixtures of partial esters of glycerin and hydroxyalkanoic acids having 12 to 30 carbon atoms and triglycerides of hydroxyalkanoic acids having 12 to 30 carbon atoms, with the ratio by weight of (A) to (B) being 1:3 to 9:1.

2. The lubricant composition according to claim 1 in which component (A) is a mixed ester of adipic acid, pentaerythrite and stearic acid.

3. The lubricant composition according to claim 1 in which component (A) is a mixed ester from adipic acid, pentaerythrite and oleic acid.

4. The lubricant composition according to claim 2 in which the molar ratio of adipic acid: pentaerythrite: stearic acid in the mixed ester component (A) is $n-1 : n : 4n-2(n-1)$, where $n$ is an integer from 2 to 8.

5. The lubricant composition according to claim 3 in which the molar ratio of adipic acid: pentaerythrite: oleic acid in the mixed ester component (A) is $n-1 : n : 4n-2(n-1)$, where $n$ is an integer from 2 to 7.

6. The lubricant composition according to claim 1 in which the mixed ester component (A) has a molecular weight of over 2000.

7. The lubricant composition according to claim 1 in which component (B) is an ester from phthalic acid and an alkanol of 12 to 30 carbon atoms.

8. The lubricant composition according to claim 7 in which the component (B) is distearyl phthalate.

9. The lubricant composition according to claim 1 in which the component (B) is glycerin mono-oleate.

10. The lubricant composition according to claim 1 in which the component (B) is a mixture consisting of about 60% glycerin triester of 12-hydroxystearic acid, about 20% glycerin diester of 12-hydroxystearic acid, and about 20% glycerin monoester of 12-hydroxystearic acid, and about 20% glycerin monoester of 12-hydroxystearic acid.

11. Lubricant according to claim 1, characterized in that its production and purification are effected by mixing component (A) immediately after its preparation by esterification with component (B) and by effecting the further processing after the mixing.

* * * * *